United States Patent
Khan et al.

(10) Patent No.: US 11,993,543 B1
(45) Date of Patent: *May 28, 2024

(54) CONCRETE WITH VOLCANIC ASH AND MICROSILICA

(71) Applicant: KING FAISAL UNIVERSITY, Al-Ahsa (SA)

(72) Inventors: Kaffayatullah Khan, Al-Ahsa (SA); Muhammad Nasir Amin, Al-Ahsa (SA); Muhammad Tayyab Naqash, Madinah (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,569

(22) Filed: Dec. 28, 2023

(51) Int. Cl.
| | |
|---|---|
| *C04B 28/04* | (2006.01) |
| *C04B 14/06* | (2006.01) |
| *C04B 103/32* | (2006.01) |
| *C04B 111/00* | (2006.01) |
| *C04B 111/34* | (2006.01) |

(52) U.S. Cl.
CPC ............ *C04B 28/04* (2013.01); *C04B 14/062* (2013.01); *C04B 2103/32* (2013.01); *C04B 2111/00017* (2013.01); *C04B 2111/34* (2013.01); *C04B 2201/52* (2013.01)

(58) Field of Classification Search
CPC ... C04B 28/04; C04B 14/062; C04B 2103/32; C04B 2111/00017; C04B 2111/34; C04B 2201/52
See application file for complete search history.

(56) References Cited

U.S. PATENT DOCUMENTS 11,401,216 B2 * 8/2022 Olson ................... C04B 14/28

FOREIGN PATENT DOCUMENTS

| CN | 104098311 A | | 10/2014 |
|---|---|---|---|
| CN | 104909648 A | * | 9/2015 |
| CN | 105314952 A | * | 2/2016 |

OTHER PUBLICATIONS

Elsheikh, Mohamed Y., et al. "Igneous Concrete Utilizing Volcanic Ash." Int. J. Civ. Eng. Technol 11 (2020): 73-90.
Ahmad, Shamsad, et al. "Influence of admixing natural pozzolan as partial replacement of cement and microsilica in UHPC mixtures." Construction and Building Materials 198 (2019): 437-444.
Al-Bahar, S., et al. "Nanomechanical and surface morphological properties of hydrated cement paste containing volcanic ash and micro-or nano-silica." KSCE Journal of Civil Engineering 22 (2018): 1354-1360.
Rosales, Julia, et al. "Effect of Processed Volcanic Ash as Active Mineral Addition for Cement Manufacture." Materials 15.18 (2022): 6305.
Khan, Kaffayatullah, et al. "Effect of fineness and heat treatment on the pozzolanic activity of natural volcanic ash for its utilization as supplementary cementitious materials." Crystals 12.2 (2022): 302.
Amin, Muhammad Nasir, and Kaffayatullah Khan. "Mechanical performance of high-strength sustainable concrete under fire incorporating locally available volcanic ash in central Harrat Rahat, Saudi Arabia." Materials 14.1 (2020): 21.

* cited by examiner

*Primary Examiner* — Anthony J Green
(74) *Attorney, Agent, or Firm* — Nath, Goldberg & Meyer; Richard C. Litman

(57) ABSTRACT

A method of producing green concrete, and particularly to green concrete with Portland cement (C), natural basaltic volcanic ash pozzolan (VA), and microsilica (MS). The green concrete described herein is a high-performance green concrete composition that partially substitutes Portland Cement (C) and can further include fine aggregates (FA) and coarse aggregates (CA), water (W), and a super plasticizer (SP). The green concrete described herein can be cured at ambient temperature and can have a better compressive strength and durability properties, and high shrinkage resistance as compared to conventional concrete and, as such, can be used for high performance applications.

19 Claims, 1 Drawing Sheet

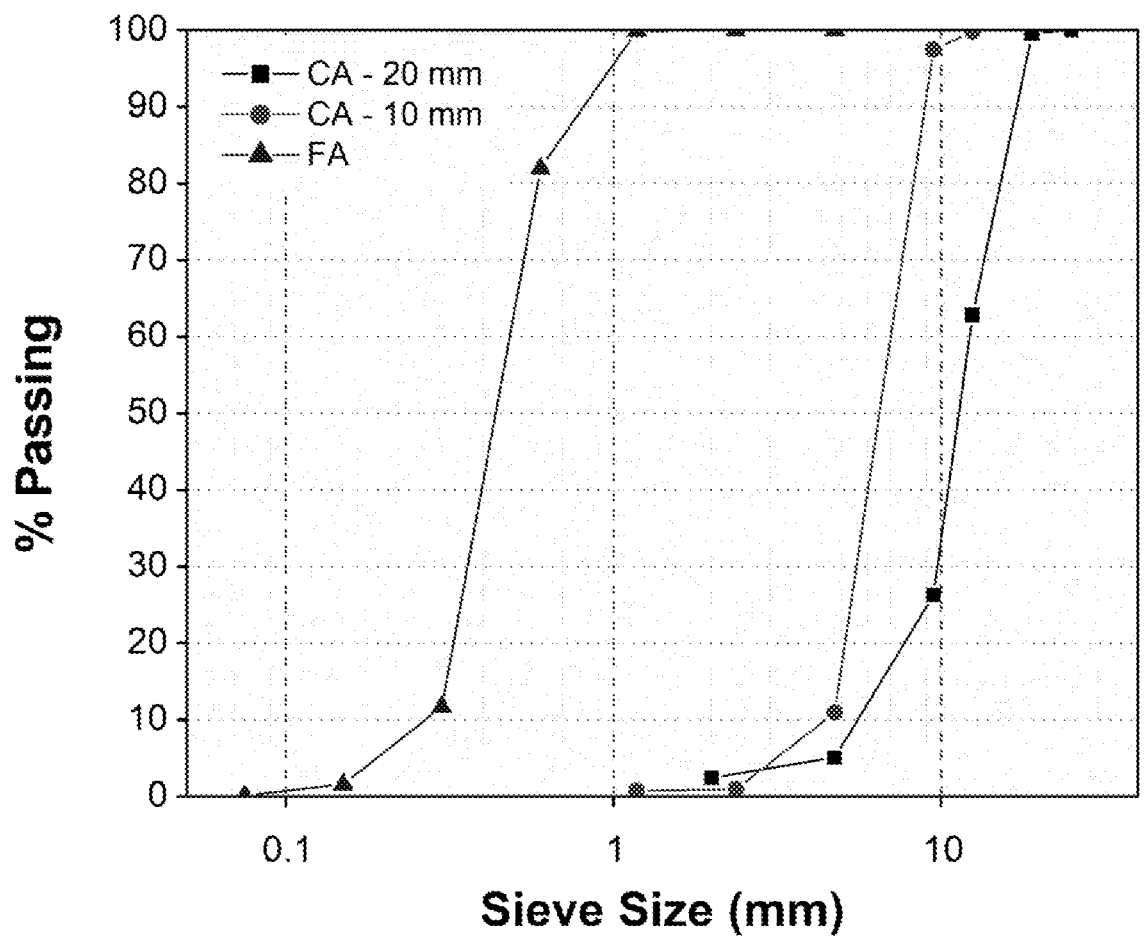

CONCRETE WITH VOLCANIC ASH AND MICROSILICA

BACKGROUND

Field

The disclosure of the present patent application relates to a composition of producing green concrete, and particularly to green concrete with Portland cement (C), natural basaltic volcanic ash pozzolan (VA), microsilica (MS), fine aggregates (FA) and coarse aggregates (CA), water (W), and a super plasticizer (SP).

Description of Related Art

Concrete is the most widely used building material in the world and the second most consumed material on the planet, after water. Global concrete consumption is estimated to be nearly twice that of all other building materials. The broad use of concrete stems from its strength, durability, effortless molding capability, water resistance, fire resistance, wind resistance, zero maintenance, soundproofing properties, cost-effectiveness, and versatility. Concrete use is set to rise as global urbanization and economic development increases demand for new buildings and infrastructures.

However, the production of Portland cement, an essential constituent of concrete, leads to the release of significant amount of carbon dioxide and other greenhouse gases into the atmosphere which contributes to global warming. It is estimated that about 8% of global carbon dioxide emission comes from cement production.

Carbon dioxide is emitted from both the calcination process and the heating of cement kiln. During calcination, calcium carbonate and clay are heated in a kiln to form quicklime. The formed quicklime fuses with minerals in the clay and cools down into clinker. Then the clinker is grounded to make cement powder. During the process of forming quicklime, carbon dioxide is emitted as a byproduct. The source of heat during calcination is typically from a coal or natural gas fired furnace, which releases massive amounts of carbon dioxide into the atmosphere.

In order to reduce the carbon dioxide emission associated with the manufacturing of Portland cement, researchers have suggested multiple techniques such as carbon capturing and utilization, clinker reduction, alternate fuel sources, and modifications in cement manufacturing. It has been suggested that using alternate materials that have pozzolanic properties or supplementary cementitious materials (SCM) as a replacement of clinker is the most effective way to reduce carbon dioxide emission.

Besides the reduction of carbon footprint, it is imperative that the replacement of clinker with pozzolanic materials or supplementary cementitious materials does not degrade the properties of the concrete, such as compressive strength and durability. In the context of the latter, there are several tests to determine durability of a concrete. Rapid chloride penetration (permeability) test and water absorption test are examples of test methods for determining a concrete's durability.

Rapid chloride penetration is a test performed to determine the depth to which chloride ions from the environment penetrate into the concrete. A high rapid chloride penetration value may lead to corrosion in the concrete and a subsequent reduction in strength, serviceability, and aesthetics of the structure. On the other hand, water absorption is a test performed to determine the susceptibility of an unsaturated concrete to the penetration of water. It measures the rate of absorption of water and other liquids into unsaturated concrete through capillary suction. Concretes with high water absorption value are more susceptible to durability-related damage and performance degradation.

Thus, an environmentally friendly method for producing green concrete with the desirable properties is needed.

SUMMARY

The present subject matter relates to a green method of producing concrete and the resultant concrete with Portland cement (C), natural basaltic volcanic ash pozzolan (VA), and microsilica (MS) to improve compressive strength and durability performance after aging.

In one embodiment, the present subject matter relates to a method of producing green concrete, and particularly to green concrete with Portland cement (C), natural basaltic volcanic ash pozzolan (VA), and microsilica (MS). The green concrete described herein is a high-performance green concrete composition that partially substitutes Portland Cement (C) and can further include fine aggregates (FA) and coarse aggregates (CA), water (W), and a super plasticizer (SP). The green concrete described herein can be cured at ambient temperature and can have a higher compressive strength, better durability, and high shrinkage resistance as compared to conventional concrete and, as such, can be used for high performance applications.

In an embodiment, the present subject matter relates to a green concrete comprising: a binder component comprising Portland cement (C), volcanic ash (VA), and microsilica (MS); an aggregate component comprising fine aggregates (FA) and coarse aggregates (CA); water (W); and a super plasticizer.

These and other features of the present subject matter will become readily apparent upon further review of the following specification.

BRIEF DESCRIPTION OF DRAWINGS

The sole FIGURE shows a sieve analysis of the fine and coarse aggregates used herein.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a green concrete with Portland cement (C), natural basaltic volcanic ash pozzolan (VA), and microsilica (MS) to improve compressive strength and durability performance after aging.

In one embodiment, the present subject matter relates to a method of producing green concrete, and particularly to green concrete with Portland cement (C), natural basaltic volcanic ash pozzolan (VA), and microsilica (MS). The green concrete described herein is a high-performance green concrete composition that partially substitutes Portland Cement (C) and can further include fine aggregates (FA) and coarse aggregates (CA), water (W), and a super plasticizer (SP). The green concrete described herein can be cured at ambient temperature and can have a higher compressive strength, better durability, and high shrinkage resistance as compared to conventional concrete and, as such, can be used for high performance applications.

In an embodiment, the present subject matter relates to a green concrete comprising: a binder component comprising Portland cement (C), volcanic ash (VA), and microsilica (MS); an aggregate component comprising fine aggregates (FA) and coarse aggregates (CA); water (W); and a super plasticizer.

In one embodiment, each 1 $m^3$ of the green concrete presented herein can include about 533 kg of the binder component, about 1732 kg of the aggregate component, about 160 kg of the water, and about 6.5 to about 7.5 kg of the super plasticizer. In an embodiment in this regard, the aggregate component can comprise about 1039 kg of the coarse aggregates and about 693 kg of the fine aggregates. In certain embodiments in this regard, the coarse aggregates can have a particle size passing through 10 mm and 20 mm sieves, while the fine aggregates can have a particle size passing through a 4.75 mm sieve. See the sole FIGURE for a sieve analysis of these components.

In one specific embodiment of the present green concrete, the binder component can comprise about 70% by weight of the Portland cement, about 25% by weight of the volcanic ash, and about 5% by weight of the microsilica. In an alternative specific embodiment of the present green concrete, the binder component can comprise about 60% by weight of the Portland cement, about 33% by weight of the volcanic ash, and about 7% by weight of the microsilica. In one more alternative specific embodiment of the present green concrete, the binder component can comprise about 50% by weight of the Portland cement, about 40% by weight of the volcanic ash, and about 10% by weight of the microsilica.

In an embodiment, the present green concrete can have an average compressive strength of about 52.5 to about 67.1 MPa after about 7 days. Similarly, the present green concrete can have an average compressive strength of about 72.5 to about 85.5 MPa after about 28 days, an average compressive strength of about 83.6 to about 106.0 MPa after about 91 days, and an average compressive strength of about 89.7 to about 104.8 MPa after about 365 days.

In an additional embodiment, the present green concrete can have a rapid chloride penetration of about 201 to about 269 Coulombs and about 52 to about 66 Coulombs after aging for about 91 days and about 365 days, respectively.

In another embodiment, the present green concrete can have a water absorption of about 2.52% to about 2.71% and about 2.00% to about 2.20% after aging for about 91 days and about 365 days, respectively.

In certain embodiments, the fine aggregates can comprise dune silica sand, the coarse aggregates can comprise crushed limestone, and the super plasticizer can comprise polycarboxylate ethers.

In further embodiments, the volcanic ash and the microsilica can have a Chappelle activity (mg $Ca(OH)_2$/g sample) of about 821.48 and about 1341.8, respectively.

In additional embodiments, the Portland cement, the volcanic ash, and the microsilica can have a BET surface area of about 0.374 m$^2$/g, about 0.356 m$^2$/g, and about 19.832 m$^2$/g, respectively.

In another embodiment, the coarse aggregates can have a water absorption ratio of about 0.27% to about 0.30%.

In a further embodiment, the fine aggregates can have a water absorption ratio of about 1.41%.

In one more embodiment, the fine aggregates can have a fineness modulus of about 2.05%.

The following examples illustrate the present teachings.

EXAMPLES

Example 1

Green Concrete

The obtained green concrete was produced using one of the cement mixture proportions shown in Table 1 (70C-25VA-5MS, 60C-33VA-7MS, or 50C-20VA-10MS).

TABLE 1

| | Proportions by weights (%) | | | | | | |
|---|---|---|---|---|---|---|---|
| | Binder | | | Aggregates | | Water | Super Plasticizer |
| Mix ID | C | VA | MS | FA | CA | W | SP |
| 100C | 1 | — | — | 1.30 | 1.95 | 0.3 | 0.8 |
| 70C-25VA-5MS | 0.7 | 0.25 | 0.05 | 1.30 | 1.95 | 0.30 | 1.25 |
| 60C-33VA-7MS | 0.6 | 0.33 | 0.07 | 1.30 | 1.95 | 0.30 | 1.30 |
| 50C-40VA-10MS | 0.5 | 0.40 | 0.10 | 1.30 | 1.95 | 0.30 | 1.40 |

| | Proportions by weights (kg/m$^3$ of concrete) | | | | | | |
|---|---|---|---|---|---|---|---|
| | Binder | | | Aggregates | | Water | Super Plasticizer |
| Mix ID | C | VA | MS | FA | CA | W | SP |
| 100C | 533 | — | — | 693 | 1039 | 160 | 4.3 |
| 70C-25VA-5MS | 373 | 133 | 27 | 693 | 1039 | 160 | 6.7 |
| 60C-33VA-7MS | 320 | 176 | 37 | 693 | 1039 | 160 | 7.0 |
| 50C-40VA-10MS | 227 | 213 | 53 | 693 | 1039 | 160 | 7.5 |

The chemical compositions of the Portland cement, the natural basaltic volcanic ash pozzolan, and the microsilica are shown in Table 2. The BET surface area and the particle size distribution of the Portland cement, the natural basaltic volcanic ash pozzolan, and the microsilica are shown in Table 3. The Chappelle reactivity analysis of the natural basaltic volcanic ash pozzolan and the microsilica are shown in Table 4. The Chappelle reactivity test is used as an indicator of how much of the calcium oxide (CaO) is utilized by the mentioned materials. A higher value means more calcium oxide consumption. As can be seen from the test results shown in Table 4, the microsilica sample demonstrated the highest reactivity.

TABLE 2

| | Chemical composition (oxides, % by weight) | | |
|---|---|---|---|
| | C | VA | MS |
| SiO$_2$ | 21.6 | 48.97 | 92.98 |
| Al$_2$O$_3$ | 5.56 | 16.06 | 0.0 |
| Fe$_2$O$_3$ | 3.48 | 10.91 | 1.65 |
| SiO2+ Al$_2$O$_3$+ Fe$_2$O$_3$ | — | 75.94 | 94.63 |
| CaO | 63.3 | 9.11 | 1.83 |
| MgO | 0.73 | 7.91 | 0.10 |
| Na$_2$O | 0.15 | 4.28 | 0.0 |
| K$_2$O | 0.52 | 0.71 | 0.0 |
| SO$_3$ | 2.35 | 0.01 | 0.50 |
| Cl | — | 0.03 | 0.01 |
| LOI | 2.31 | 1.91 | 2.78 |

TABLE 3

| Binder type | BET surface area (m$^2$/g) | Diameter for Selected percentiles by volume | | |
|---|---|---|---|---|
| | | D$_{10}$ (um) | D$_{50}$ (um) | D$_{90}$ (um) |
| C | 0.374 | 0.78 | 9.24 | 20.13 |
| VA | 0.356 | 3.44 | 12.21 | 28.33 |
| MS | 19.832 | 0.51 | 0.58 | 0.72 |

TABLE 4

| Materials IDs | Chappelle activity (mg Ca(OH)$_2$/g sample) |
|---|---|
| VA | 821.48 |
| MS | 1341.8 |

The physical properties of the aggregates used herein can be seen in Table 5. Locally available hard limestone-based crushed aggregate and desert sand were used in the preparation of high-strength concrete mixtures. The physical properties of both coarse and fine aggregates were tested according to the ASTM standards, as shown in Table 5. Two different sizes of coarse aggregates with a maximum particle size of 20 mm and 10 mm were used for preparation of the concrete mixture. Sieve analyses of fine aggregate and both sizes of coarse aggregates were determined according to ASTM C136, as shown in the sole FIGURE. The specific gravity and water absorption of coarse aggregates were determined according to ASTM C127. The fineness modulus of desert sand was determined according to ASTM C33. The specific gravity and water absorption of fine aggregate were also determined according to ASTM C128.

TABLE 5

| Materials | Apparent Specific Gravity | Bulk Specific Gravity (SSD) | Bulk Specific Gravity (OD) | Water Absorption Ratio (%) | Fineness Modulus |
|---|---|---|---|---|---|
| Coarse aggregate (20 mm) | 2.71 | 2.69 | 2.68 | 0.27 | |
| Coarse aggregate (10 mm) | 2.71 | 2.68 | 2.67 | 0.30 | |
| Fine aggregate | 2.67 | 2.61 | 2.57 | 1.41 | 2.05 |

Example 2

Compressive Strength after Aging

The obtained plurality of green concretes and Portland cement-based concretes produced by the methods described above were individually aged. During the aging process, one of each of the plurality of green concretes and Portland cement-based concretes were aged at about 7 days. The same procedure was conducted for aging at about 28 days, about 91 days, and about 365 days. All of the aged green concretes and Portland cement-based concretes were then used for compressive strength testing.

As shown in Table 6, the green concretes with cement mixture proportions provided higher overall compressive strengths for all the aging days relative to the Portland cement-based concretes. These data indicate that partially substituting Portland cement up to 40% with supplementary cementitious materials (SCM) such as natural basaltic volcanic ash pozzolan and the microsilica in a cement mixture provide a higher compressive strength relative to a cement mixture having about 100% by weight of the Portland cement. The mix partially substituting Portland cement up to 50% (50C-40VA-10MS) with supplementary cementitious materials (SCM) such as natural basaltic volcanic ash pozzolan and the microsilica in a cement mixture show comparatively less compressive strength as compared to control but still fulfill the requirement of high performance concrete.

TABLE 6

| Mixes ID | Compressive Strength (MPa) | | | |
|---|---|---|---|---|
| | 7 days | 28 days | 91 days | 365 days |
| 100C | 62.0 | 78.3 | 98.5 | 102.0 |
| 70C-25VA-5MS | 67.1 | 85.5 | 106.0 | 104.8 |
| 60C-33VA-7MS | 63.5 | 85.0 | 100.8 | 101.2 |
| 50C-40VA-10MS | 52.5 | 72.5 | 83.6 | 89.7 |

Example 3

Rapid Chloride Penetration and Water Absorption after Aging

The obtained plurality of green concretes and Portland cement-based concretes produced by the methods described above were individually aged. During the aging process, one of each of the plurality of green concretes and Portland cement-based concretes were aged at about 91 days. The same procedure was conducted for aging at about 365 days. All of the aged green concretes and Portland cement-based concretes were then used for rapid chloride penetration testing and water absorption testing.

As shown in Table 7, the green concretes presented herein exhibited lower overall rapid chloride penetration and water absorption values for all the aging days relative to the Portland cement-based concretes. These data show that partially substituting Portland cement with supplementary cementitious materials (SCM) such as natural basaltic volcanic ash pozzolan and microsilica in a cement mixture provide lower rapid chloride penetration and water absorption values relative to a cement mixture having about 100% by weight of the Portland cement. The lower rapid chloride penetration and water absorption values resulted in improved durability performance of the green concretes. Similarly, Table 8 shows autogenous shrinking of the present green concretes at 28 days and ultimate drying shrinkage at 97 days.

TABLE 7

| Mixes ID | Rapid Chloride Penetration Test (Coulombs) | | Water Absorption (%) | |
|---|---|---|---|---|
| | 91 days | 365 days | 91 days | 365 days |
| 100C | 1038 | 409 | 3.20 | 2.81 |
| 70C-25VA-5MS | 240 | 54 | 2.61 | 2.07 |
| 60C-33VA-7MS | 201 | 66 | 2.52 | 2.00 |
| 50C-40VA-10MS | 269 | 52 | 2.71 | 2.20 |
| 70C-25VA-5MS | 240 | 54 | 2.61 | 2.07 |
| 60C-33VA-7MS | 201 | 66 | 2.52 | 2.00 |
| 50C-40VA-10MS | 269 | 52 | 2.71 | 2.20 |

TABLE 8

| Mixes ID | Autogenous shrinkage (microns) 28 days | Drying shrinkage (microns)* 97 days |
|---|---|---|
| 100C | 700 | 447 |
| 70C-25VA-5MS | 381 | 315 |
| 60C-33VA-7MS | 505 | 431 |
| 50C-40VA-10MS | 264 | 468 |

*Drying shrinkage measurement started at age of 7 days after exposure

It is to be understood that the green concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A green concrete comprising:
   a binder component comprising Portland cement (C), volcanic ash (VA), and microsilica (MS);
   an aggregate component comprising fine aggregates (FA) and coarse aggregates (CA);
   water (W); and
   a super plasticizer;
   wherein the binder component comprises about 70% by weight of the Portland cement, about 25% by weight of the volcanic ash, and about 5% by weight of the microsilica.

2. The green concrete as recited in claim 1, wherein each 1 m$^3$ of concrete includes about 533 kg of the binder component, about 1732 kg of the aggregate component, about 160 kg of the water, and about 4.3 to about 7.5 kg of the super plasticizer.

3. The green concrete as recited in claim 2, wherein the aggregate component comprises about 1039 kg of the coarse aggregates and about 693 kg of the fine aggregates.

4. The green concrete as recited in claim 2, wherein the binder component comprises about 60% by weight of the Portland cement, about 33% by weight of the volcanic ash, and about 7% by weight of the microsilica.

5. The green concrete as recited in claim 2, wherein the binder component comprises about 50% by weight of the Portland cement, about 40% by weight of the volcanic ash, and about 10% by weight of the microsilica.

6. The green concrete as recited in claim 1, having an average compressive strength of about 52.5 to about 67.1 MPa after about 7 days.

7. The green concrete as recited in claim 1, having an average compressive strength of about 72.5 to about 85.5 MPa after about 28 days.

8. The green concrete as recited in claim 1, having an average compressive strength of about 83.6 to about 106.0 MPa after about 91 days.

9. The green concrete as recited in claim 1, having an average compressive strength of about 89.7 to about 104.8 MPa after about 365 days.

10. The green concrete as recited in claim 1, having a rapid chloride penetration of about 201 to about 269 Coulombs and about 52 to about 66 Coulombs after aging for about 91 days and about 365 days, respectively.

11. The green concrete as recited in claim 1, having a water absorption of about 2.52% to about 2.71% and about 2.00% to about 2.20% after aging for about 91 days and about 365 days, respectively.

12. The green concrete as recited in claim 1, wherein the volcanic ash and the microsilica have a Chappelle activity (mg Ca(OH)$_2$/g sample) of about 821.48 and about 1341.8, respectively.

13. The green concretes as recited in claim 1, wherein the Portland cement, the volcanic ash, and the microsilica have a BET surface area of about 0.374 m$^2$/g, about 0.356 m$^2$/g, and about 19.832 m$^2$/g, respectively.

14. The green concrete as recited in claim 1, having an autogenous shrinkage of 381 um after 28 days of curing at temperature 20° C. and humidity of 90%.

15. The green concrete as recited in claim 4, having an autogenous shrinkage of 505 um after 28 days of curing at temperature 20° C. and humidity of 90%.

16. The green concrete as recited in claim 5, having an autogenous shrinkage of 264 um after 28 days of curing at temperature 20° C. and humidity of 90%.

17. The green concrete as recited in claim 1, an ultimate drying shrinkage of 315 um after 97 days of curing at temperature 20° C. and humidity of 60%.

18. The green concrete as recited in claim 4, having an ultimate drying shrinkage of 431 um after 97 days of curing at temperature 20° C. and humidity of 60%.

19. The green concrete as recited in claim 5, having an ultimate drying shrinkage of 468 um after 97 days of curing at temperature 20° C. and humidity of 60%.

* * * * *